United States Patent
Fink et al.

(10) Patent No.: US 9,684,648 B2
(45) Date of Patent: Jun. 20, 2017

(54) DISAMBIGUATING WORDS WITHIN A TEXT SEGMENT

(75) Inventors: Patrick W. Fink, Charlotte, NC (US); Kristin E. McNeil, Charlotte, NC (US); Philip E. Parker, York, SC (US)

(73) Assignee: International Business Machines Corporation, Armonk, NY (US)

( * ) Notice: Subject to any disclaimer, the term of this patent is extended or adjusted under 35 U.S.C. 154(b) by 880 days.

(21) Appl. No.: 13/485,001

(22) Filed: May 31, 2012

(65) Prior Publication Data
US 2013/0325439 A1 Dec. 5, 2013

(51) Int. Cl.
*G06F 17/20* (2006.01)
*G06F 17/21* (2006.01)
*G06F 17/27* (2006.01)
*G06F 17/28* (2006.01)

(52) U.S. Cl.
CPC ........ *G06F 17/2755* (2013.01); *G06F 17/278* (2013.01)

(58) Field of Classification Search
None
See application file for complete search history.

(56) References Cited

U.S. PATENT DOCUMENTS

| | | | |
|---|---|---|---|
| 6,044,344 A * | 3/2000 | Kanevsky | G10L 15/063 704/244 |
| 6,311,152 B1 * | 10/2001 | Bai et al. | 704/9 |
| 7,039,166 B1 * | 5/2006 | Peterson | H04M 3/493 379/265.03 |
| 7,386,545 B2 | 6/2008 | Ashutosh et al. | |
| 7,526,425 B2 | 4/2009 | Marchisio et al. | |
| 7,565,368 B2 | 7/2009 | Zartler et al. | |
| 7,685,201 B2 | 3/2010 | Zeng et al. | |
| 7,739,102 B2 | 6/2010 | Bender | |

(Continued)

OTHER PUBLICATIONS

Day et al., "Mixed-Initiative Development of Language Processing Systems," Proceedings of the Fifth ACL Conference on Applied Natural Language Processing, pp. 348-355, 1997.

(Continued)

*Primary Examiner* — Richemond Dorvil
*Assistant Examiner* — Thuykhanh Le
(74) *Attorney, Agent, or Firm* — Mollborn Patents, Inc.; Fredrik Mollborn

(57) ABSTRACT

Determining a subject type for an entity in a text segment. A text segment is selected, which includes one or more single-word or multi-word entities. Natural language processing is performed on the selected text segment to identify entities that constitute subjects of the selected text segment. One entity is selected. A variant annotation is associated with the selected entity. The variant annotation reflects multiple subject types for the selected entity and a value for each subject type. The most probable subject type is determined for the selected entity, based on a combination of natural language processing rules and dictionary listings. The value of the annotation is incremented for the subject type corresponding to the most probable subject type for the selected entity, so that the highest value of the annotation indicates the most probable subject type for the selected entity within the selected text segment.

12 Claims, 2 Drawing Sheets

(56) References Cited

U.S. PATENT DOCUMENTS

| | | | |
|---|---|---|---|
| 7,912,705 B2* | 3/2011 | Wasson | G06F 17/241 704/9 |
| 8,000,956 B2 | 8/2011 | Brun et al. | |
| 8,036,876 B2* | 10/2011 | Sanfilippo | G06F 17/2785 704/10 |
| 8,239,216 B2* | 8/2012 | McCallie, Jr. | G06F 17/30657 705/2 |
| 8,271,453 B1* | 9/2012 | Pasca et al. | 707/673 |
| 8,702,032 B2* | 4/2014 | Charles | B64C 25/405 244/103 R |
| 2004/0148170 A1* | 7/2004 | Acero et al. | 704/257 |
| 2005/0049852 A1* | 3/2005 | Chao | 704/9 |
| 2006/0047500 A1* | 3/2006 | Humphreys | G06F 17/278 704/9 |
| 2007/0136048 A1* | 6/2007 | Richardson-Bunbury et al. | 704/9 |
| 2007/0233656 A1 | 10/2007 | Bunescu et al. | |
| 2008/0040352 A1 | 2/2008 | Ellis | |
| 2008/0065621 A1 | 3/2008 | Ellis | |
| 2008/0168343 A1 | 7/2008 | Doganata et al. | |
| 2008/0319978 A1* | 12/2008 | Brun et al. | 707/5 |
| 2009/0070103 A1* | 3/2009 | Beggelman et al. | 704/9 |
| 2009/0144609 A1 | 6/2009 | Liang et al. | |
| 2010/0076972 A1 | 3/2010 | Baron et al. | |
| 2010/0235165 A1 | 9/2010 | Todhunter et al. | |
| 2010/0287210 A1 | 11/2010 | Olof-Ors et al. | |
| 2010/0293195 A1 | 11/2010 | Houghton | |
| 2010/0293451 A1 | 11/2010 | Carus | |
| 2011/0106807 A1 | 5/2011 | Srihari et al. | |
| 2011/0301941 A1 | 12/2011 | De Vocht | |
| 2012/0078906 A1* | 3/2012 | Anand | G06F 17/30702 707/737 |

OTHER PUBLICATIONS

Ruotsalo et al., "Knowledge-Based Linguistic Annotation of Digital Cultural Heritage Collections," IEEE Intelligent Systems, pp. 64-75, Mar./Apr. 2009.

Vanderwende, "Algorithm for Automatic Interpretation of Noun Sequences," Coling '94 Proc. of the 15th Conf. on Computational Linguistics—vol. 2, pp. 782-788, 1994.

* cited by examiner

DISAMBIGUATING WORDS WITHIN A TEXT SEGMENT

BACKGROUND

The present invention relates to text analytics, and more specifically, to disambiguating words within sentences. Text analytics relies on properly determining the use of words within a sentence, for example, determining the subject, action, and target of a sentence. One challenge in making such determinations is that some words have multiple meanings In addition, words may have different meanings depending on how the words are used in a sentence. For example, in the sentence "St. Paul loves you." St. Paul could mean either a location (for example, St. Paul, Minn.) or a person. Even within the same paragraph, the same words can have different meanings.

Conventional text analytics methodologies lack means for determining the meaning of a word within a paragraph. However, deriving the author's intent for the use of the word is critical for extracting meaningful information from unstructured text.

Another example is "Charlotte is cool. Let's go there this weekend. Charlotte has a nice museum." It would be helpful to know that the author of the text is referring to a city named Charlotte, and not to a person named Charlotte. Thus, there is a need for improved mechanisms for disambiguating words within text segments.

SUMMARY

According to embodiments of the present invention, methods, apparatus, and computer program products are provided for determining a subject type for an entity in a text segment. A text segment is selected. The text segment includes one or more single-word or multi-word entities. Natural language processing is performed on the selected text segment to identify one or more entities that constitute subjects of the selected text segment. One of the identified entities is selected. A variant annotation is associated with the selected entity. The variant annotation can reflect multiple subject types for the selected entity and a value for each subject type. The most probable subject type is determined for the selected entity, based on a combination of natural language processing rules and dictionary listings. The value of the annotation is incremented for the subject type corresponding to the most probable subject type for the selected entity, so that the highest value of the annotation indicates the most probable subject type for the selected entity within the selected text segment.

The details of one or more embodiments of the invention are set forth in the accompanying drawings and the description below. Other features and advantages of the invention will be apparent from the description and drawings, and from the claims.

DESCRIPTION OF DRAWINGS

Like reference symbols in the various drawings indicate like elements.

DETAILED DESCRIPTION

Figure 1:
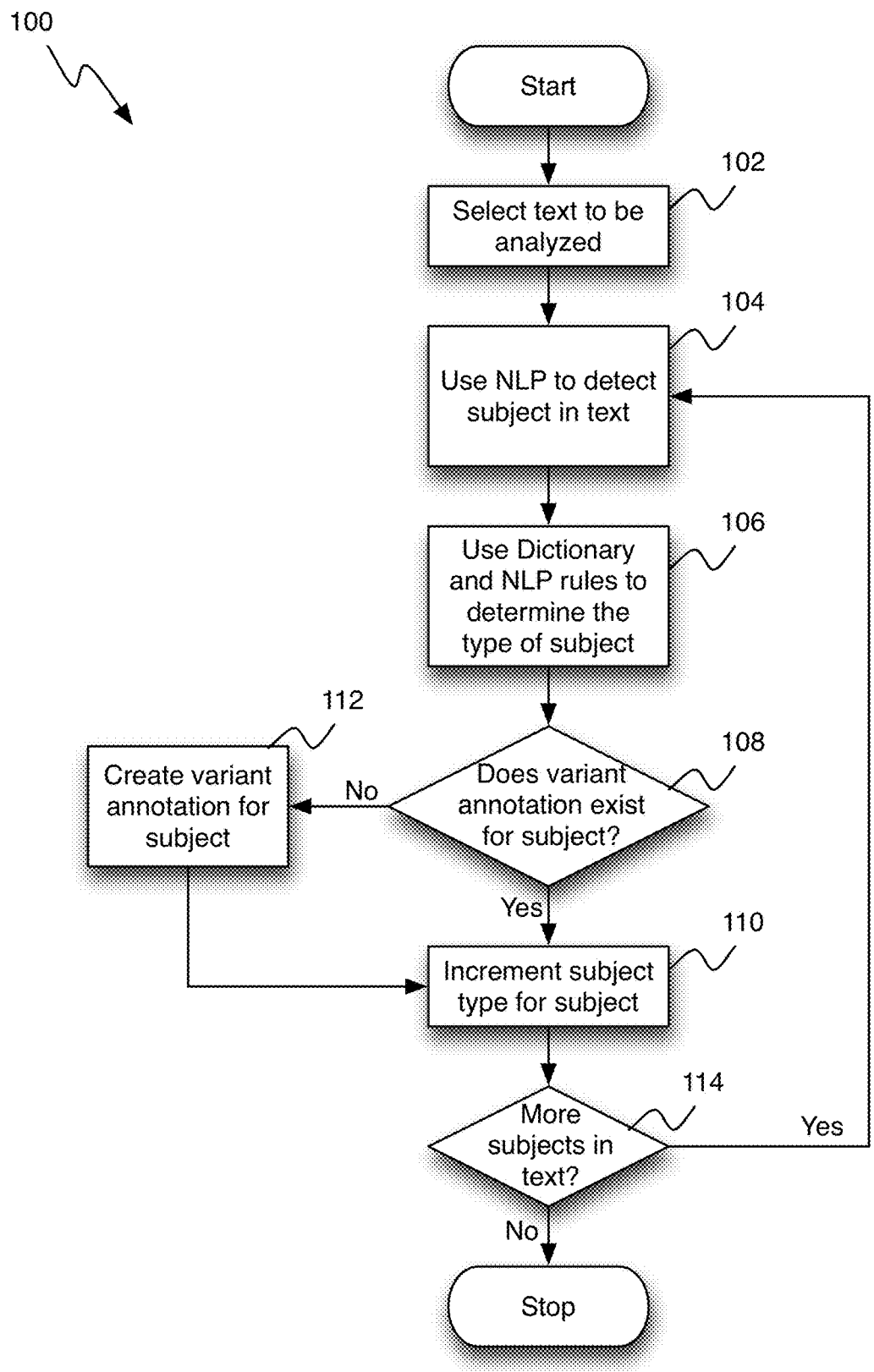
FIG. 1 shows a flowchart of a process (100) for analyzing text to determine the subject types of the text, in accordance with one embodiment.

The various embodiments of the invention described herein pertain to text analytics. In particular, natural language processing (NLP) and text analytics are used together to generate a variant annotation that can reflect multiple types, based on the data stored within the variant annotation. Variant annotations have the ability to determine the best guess among a set of annotations types as to which type the author of a text segment intended the word to mean, given the text. This allows the determination the most appropriate meaning of a word.

To illustrate the use of the variant annotation, consider the following example sentence:

"I went to the doctor today with vision complaints. I was diagnosed with MD (macular degeneration)."

In this example, "MD" could mean many different things, but the abbreviation "MD" is located spatially close to the phrase "macular degeneration". Thus, the variant annotation will indicate that "MD" likely refers to a medical condition. As the skilled person realizes, this becomes more important in large portions of text, where "MD" might refer to multiple concepts throughout the text. The disambiguation techniques described herein can be applied in a variety of settings in which the meaning of words needs to be determined, such as, various types of content analytics applications, for example.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a flowchart of a process (100) for analyzing text to determine the subject types of the text, in accordance with one embodiment. For purposes of explanation, the following example text segment will be used:

"Charlotte is cool. Let's go there this weekend. Charlotte has a nice museum."

It should however, be realized that in real-life situations, much larger text segments can be used. Similarly, while the various embodiments will be described herein within the context of English language text, it should be realized that the same principles are also applicable to other languages, assuming that appropriate modifications are made to accommodate the grammatical structure of the various languages. It should also be noted that the techniques described herein can be used not only to disambiguate words, but also to disambiguate ambiguous abbreviations, initials, contractions, acronyms, etc. that may arise within various fields of study. For example, the medical field has specialty studies that independently have adopted shorthand for terms. There is some degree of overlap of common shorthand notations that could be disambiguated based on the surrounding text.

As can be seen in FIG. 1, the process (100) starts by selecting the text that is to be analyzed, that is, the text segment recited above, in this case (step 102). The text selection can be determined, for example, by what are termed as "break rules". That is, an entire document can be accepted and the broken into smaller pieces based on various rules, as is familiar to those of ordinary skill in the art. For example, in some embodiments, paragraph selection (denoted by newline characters) within a document, can be used as "break rules." In other embodiments, other rules are used, such as blindly selecting a certain number of sentences, or even applying various types of machine learning or artificial intelligence to select sequential sentences that have similarities.

Next, Natural Language Processing (NLP) is performed on the selected text to interpret the text and determine the subjects of the text (step 104). As people of ordinary skill in the art realize, there are many ways in which this can be done. For example, it is possible to grammatically analyze the sentences (using NLP) and select all nouns. Parts-of-speech determination can be found using a commercially available product such as the IBM® LanguageWare® product. (IBM and LanguageWare are trademarks of International Business Machines Corporation, registered in many jurisdictions worldwide.) In some embodiments, only nouns that are subjects of sentences are selected. In yet other embodiments, the list of subjects can be further narrowed to only sentences that describe the same concept (as described above with machine learning principles).

Next the dictionary and NLP rules are used to determine the most probable type among a set of potential annotation types available in the text analysis system, for example, a location or a person) of an identified subject (step 106). In one implementation, this determination is made at least in part based on the surrounding text. For example, using spatial locality, the subject "Charlotte" followed by the words "go there" in the next sentence indicates that "Charlotte" in this case likely refers to a location. It should, however, be noted that depending on the NLP rules that are used, the various embodiments are not limited to spatial proximity of words. There may be embodiments in which the type or definition of items span multiple sentences, even when the sentences individually may not contain completely specified ideas. In such embodiments, the process can pick up "clues" from many sentences within a selection of text and use these clues to determine the subjects' definitions within the segment of text.

It should be noted that "dictionaries", in this context, refer to lists of words that share a common trait. For example, the words John, Charlotte, Philip, Fredrik, Kristin, and Patrick might appear in a "dictionary" of first names. Similarly, if the subjects of a selection of text consisted of Richmond, Des Moines, Sacramento, and Budapest, a rule might exist that counts the number of references to items in a location dictionary, and uses that number to determine that Richmond is a location rather than a person if a certain threshold is exceeded. In this example, Richmond would appear in both the person and the location dictionaries, but the processing rule would tilt the variant annotation to the location determination. It should be noted, though, that in some embodiments standard dictionary definitions can be used for disambiguation as part of the natural language processing, either by themselves or in combination with the "dictionaries" described above.

The process then determines whether a variant annotation exists for the subject (step 108). If a variant annotation does not exist for the current subject, then a new variant annotation is created (step 112) for the new subject. If it is determined that a variant annotation does exist, the probable subject type counter(s) in the variant annotation is incremented for that particular subject (step 110). In some embodiments, in the event that there is ambiguity between several possible variant annotations, then multiple counters are incremented.

Next, the process checks whether there are any more subjects in the text (step 114). If there are more subjects identified within the text, then the process returns to step 104 and continues as described above. If there are no further subjects in the text, then the process (100) ends.

At the completion of the process (100), the variant annotations contain the most likely subject types for the selection of text. Based on the above example text, the variant annotation can be the following:

```
+Charlotte
 -Location + 3
 -Person + 1
 -Organization 0
 -etc.
```

Thus, it can be reasonably concluded that "Charlotte" in the above text segment refers to a location. In some embodiments, the variant annotation can also be used to provide a "most-likely-candidate-subtype" for a given word (for example, a "city" or "country" could be defined as subtypes for the type "location" in the above example). Similarly, the variant annotation can be used to determine the second most-likely-candidate-type. For example, in the event that "Charlotte" were not to refer to a location, then it would likely be a person, since the Person category above got one count.

Figure 2:
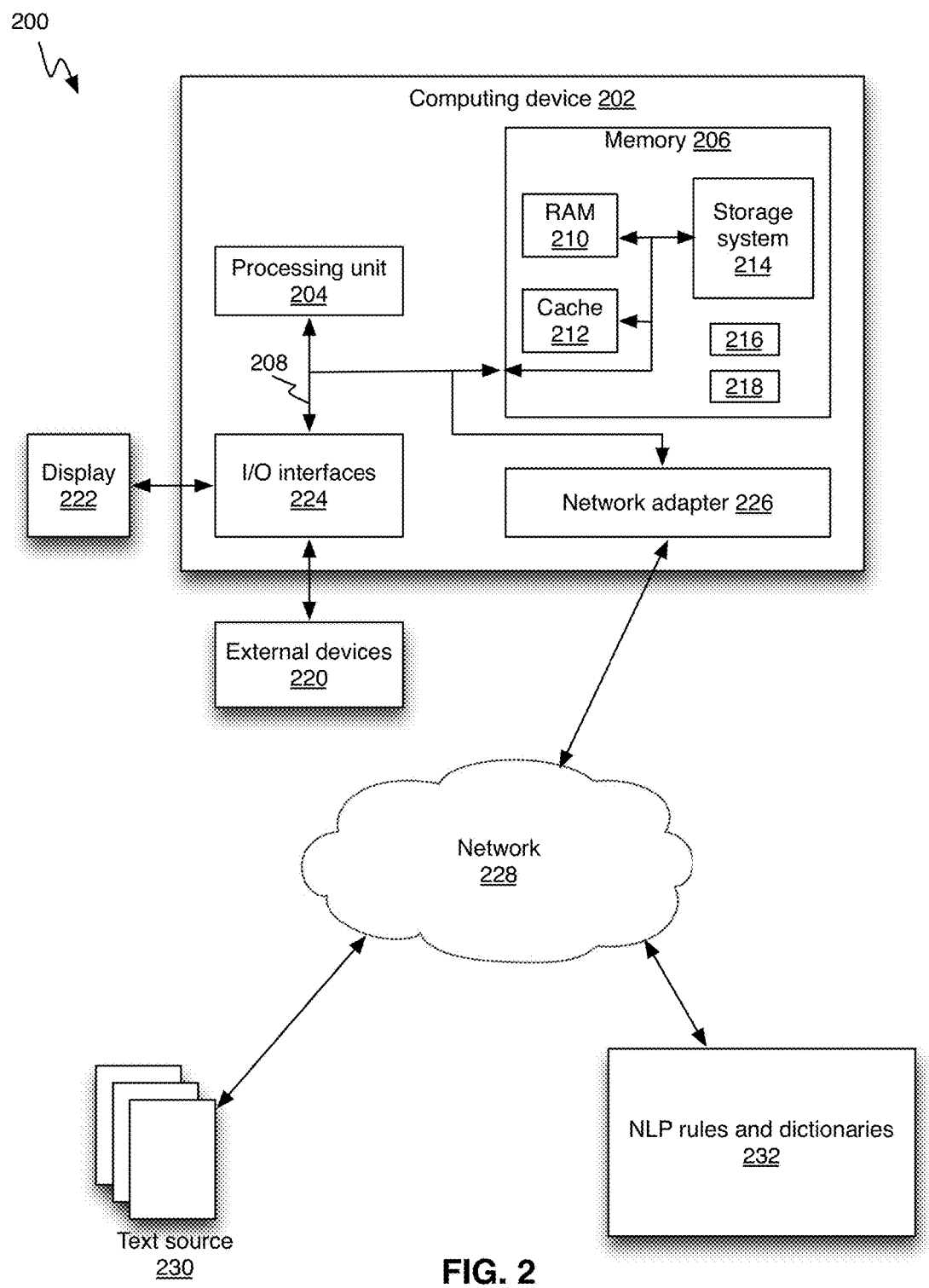
FIG. 2 shows a schematic of an example of a system (200) for analyzing text to determine the subject types of the text, in accordance with one embodiment.

FIG. 2 shows a schematic of an example of a system (200) for analyzing text to determine the subject types of the text, in accordance with one embodiment. The system (200) shown in FIG. 2 is only one example of a suitable system and is not intended to suggest any limitation as to the scope of use or functionality of embodiments of the invention described herein. Regardless, the system (200) is capable of being implemented and/or performing any of the functionality set forth hereinabove.

In the embodiment shown in FIG. 2, the system (200) is shown in the form of a general-purpose computing device (202). The components of the computing device (202) may include, but are not limited to, one or more processors or processing units (204), a system memory (206), and a bus (208) that couples various system components including the system memory (206) to the processor (204).

The bus (208) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computing device (202) typically includes a variety of computer system readable media. Such media may be any available media that is accessible by the computing device (202) and it includes both volatile and non-volatile media, removable and non-removable media.

The memory (206) can include computer system readable media in the form of volatile memory, such as a random access memory (RAM) (210) and/or a cache memory (212). The computing device (202) may further include other removable/non-removable, volatile/non-volatile computer system storage media. By way of example only, a storage system (214) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus (208) by one or more data media interfaces. The memory (206) may include at least one program product having a set (e.g., at least one) of program modules that are configured to carry out the functions of embodiments of the invention.

A program/utility (216), having a set (at least one) of program modules (218), may be stored in the memory (206) by way of example, and not limitation, as well as an operating system, one or more application programs, other program modules, and program data. Each of the operating system, one or more application programs, other program modules, and program data or some combination thereof, may include an implementation of a networking environment. The program modules (218) generally carry out the functions and/or methodologies of embodiments of the invention as described herein. The computing device (202) may also communicate with one or more external devices (220) such as a keyboard, a pointing device, a display (222), etc.; one or more devices that enable a user to interact with the computing device (202); and/or any devices (e.g., network card, modem, etc.) that enable the computing device (202) to communicate with one or more other computing devices. Such communication can occur via Input/Output (I/O) interfaces (224). Still yet, the computing device (202) can communicate with one or more networks such as a local area network (LAN), a general wide area network (WAN), and/or a public network (e.g., the Internet) (228) through a network adapter (226).

As depicted, the network adapter (226) communicates with the other components of the computing device (202) through the bus (208). It should be understood that although not shown, other hardware and/or software components could be used in conjunction with the computing device (202). Examples, include, but are not limited to: microcode, device drivers, redundant processing units, external disk drive arrays, RAID systems, tape drives, and data archival storage systems, etc.

As shown in FIG. 2, a text source (230) containing text segments to be analyzed is accessed through the network (228), but it should be realized that the text source (230) does not need to be external to the computing device (202), but can also be stored internally in the memory (206) of the computing device (202). Various combinations of internal and external text sources (230) can also be used. It should further be noted that for simplicity, FIG. 2 only shows a single text source (230), although in a real-life implementation, text to be analyzed can be obtained from a variety of text sources (230).

FIG. 2 also shows a collection of NLP rules and dictionaries (232) that is accessed through the network (228), but it should be realized that the NLP rules and dictionaries (232) do not need to be external to the computing device (202), but can also be stored internally in the memory (206) of the computing device (202). Various combinations of internal and external NLP rules and dictionaries (232) can also be used. It should further be noted that for simplicity, FIG. 2 only shows a single collection of NLP rules and dictionaries (232), although in some implementations there may be multiple collections (232) that are used for various purposes.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. For example, instead of using NLP rules, there may be embodiments that simply use "grammar rules", which typically are much simpler than NLP rules.

The various embodiments were chosen and described in order to best explain the principles of the invention and the practical application, and to enable others of ordinary skill in the art to understand the invention for various embodiments with various modifications as are suited to the particular use contemplated.

The invention claimed is:

1. A computer-implemented method for determining a subject type for an entity in a text segment, the method comprising:
    selecting, by a computer processor, a text segment, wherein the text segment includes one or more single-word or multi-word entities;
    performing, by the computer processor, natural language processing on the selected text segment to identify one or more entities that constitute subjects of the selected text segment;
    selecting, by the computer processor, one of the identified entities;
    associating, by the computer processor, a variant annotation with the selected entity, wherein the variant annotation is operable to reflect multiple subject types for the selected entity and a value for each subject type;
    determining, by the computer processor, the most probable subject type for the selected entity, based on a combination of natural language processing rules and dictionary listings, by examining single-word and multi-word non-subject entities that are located in spatial proximity to the selected entity to obtain information as to possible subject types for the selected entity; and
    incrementing, by the computer processor, the value of the annotation for the subject type corresponding to the most probable subject type for the selected entity, whereby the highest value of the annotation indicates the most probable subject type for the selected entity within the selected text segment,
    wherein in the event that a most probable subject type cannot be determined for the selected entity, incrementing the value of the annotation for two or more probable subject types for the selected entity to determine the most probable subject type for the selected entity.

2. The method of claim 1, wherein each dictionary includes a list of words that share a common trait.

3. The method of claim 2, wherein the common trait corresponds to a subject type that is used by the annotation.

4. The method of claim 1, further comprising:
    determining a most probable subject subtype for the selected entity, wherein each subtype is part of a subject type and wherein the subtypes are included in the annotation; and
    incrementing the value of the annotation for the subject subtype corresponding to the most probable subject type for the selected entity, whereby the highest value of the annotation indicates the most probable subject subtype for the selected entity within the selected text segment.

5. A computer program product for determining a subject type for an entity in a text segment, the computer program product comprising:
    a non-transitory computer readable storage medium having computer readable program code embodied therewith, the computer readable program code comprising:
    computer readable program code configured to select a text segment, wherein the text segment includes one or more single-word or multi-word entities;
    computer readable program code configured to perform natural language processing on the selected text segment to identify one or more entities that constitute subjects of the selected text segment;

computer readable program code configured to select one of the identified entities;

computer readable program code configured to associate a variant annotation with the selected entity, wherein the variant annotation is operable to reflect multiple subject types for the selected entity and a value for each subject type;

computer readable program code configured to determine the most probable subject type for the selected entity, based on a combination of natural language processing rules and dictionary listings, by examining single-word and multi-word non-subject entities that are located in spatial proximity to the selected entity to obtain information as to possible subject types for the selected entity; and computer readable program code configured to increment the value of the annotation for the subject type corresponding to the most probable subject type for the selected entity, whereby the highest value of the annotation indicates the most probable subject type for the selected entity within the selected text segment, wherein in the event that a most probable subject type cannot be determined for the selected entity, computer readable program code configured to increment the value of the annotation for two or more probable subject types for the selected entity to determine the most probable subject type for the selected entity.

6. The computer program product of claim 5, wherein each dictionary includes a list of words that share a common trait.

7. The computer program product of claim 6, wherein the common trait corresponds to a subject type that is used by the annotation.

8. The computer program product of claim 5, further comprising:

computer readable program code configured to determine a most probable subject subtype for the selected entity, wherein each subtype is part of a subject type and wherein the subtypes are included in the annotation; and computer readable program code configured to increment the value of the annotation for the subject subtype corresponding to the most probable subject type for the selected entity, whereby the highest value of the annotation indicates the most probable subject subtype for the selected entity within the selected text segment.

9. A system for determining a subject type for an entity in a text segment, the system comprising:
a processor; and
a memory storing instructions that are executable by the processor, the instructions including instructions to:
select a text segment, wherein the text segment includes one or more single-word or multi-word entities;
perform natural language processing on the selected text segment to identify one or more entities that constitute subjects of the selected text segment; select one of the identified entities;
associate a variant annotation with the selected entity, wherein the variant annotation is operable to reflect multiple subject types for the selected entity and a value for each subject type;
determine the most probable subject type for the selected entity, based on a combination of natural language processing rules and dictionary listings, by examining single-word and multi-word non-subject entities that are located in spatial proximity to the selected entity to obtain information as to possible subject types for the selected entity; and
increment the value of the annotation for the subject type corresponding to the most probable subject type for the selected entity, whereby the highest value of the annotation indicates the most probable subject type for the selected entity within the selected text segment,
wherein in the event that a most probable subject type cannot be determined for the selected entity, increment the value of the annotation for two or more probable subject types for the selected entity to determine the most probable subject type for the selected entity.

10. The system of claim 9, wherein each dictionary includes a list of words that share a common trait.

11. The system of claim 10, wherein the common trait corresponds to a subject type that is used by the annotation.

12. The system of claim 9, wherein the memory further includes instructions to:
determine a most probable subject subtype for the selected entity, wherein each subtype is part of a subject type and wherein the subtypes are included in the annotation; and
increment the value of the annotation for the subject subtype corresponding to the most probable subject type for the selected entity, whereby the highest value of the annotation indicates the most probable subject subtype for the selected entity within the selected text segment.

* * * * *